US006299762B1

(12) United States Patent
Szabo et al.

(10) Patent No.: US 6,299,762 B1
(45) Date of Patent: Oct. 9, 2001

(54) OIL-FILTER ASSEMBLY

(75) Inventors: Arpad Szabo, Lappersdorf; Georg Wittenzellner, Obertraubling, both of (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 0 days.

(21) Appl. No.: 09/469,631

(22) Filed: Dec. 22, 1999

(30) Foreign Application Priority Data

Dec. 23, 1998 (DE) ............................................ 198 59 826

(51) Int. Cl.[7] ................................................. B01D 35/027

(52) U.S. Cl. ........................... 210/90; 210/172; 210/238; 210/450; 210/452; 210/470

(58) Field of Search ............................. 210/90, 172, 238, 210/450–453, 455, 470, 474, 477, 484

(56) References Cited

U.S. PATENT DOCUMENTS 3,368,679 * 2/1968 Bozek .................................. 210/90
3,853,763 * 12/1974 Hall ..................................... 210/315
5,417,855 * 5/1995 Gershenson ......................... 210/315

FOREIGN PATENT DOCUMENTS 1907085 12/1964 (DE) .

* cited by examiner

*Primary Examiner*—Matthew O. Savage
(74) *Attorney, Agent, or Firm*—Hebert Dubno; Andrew Wilford

(57) ABSTRACT

An oil-filter assembly has an upwardly open can generally centered on an upright axis and having at an upper rim a mounting ring having in turn an axially upwardly directed annular seal surface and, offset axially downward therefrom, an annular upwardly directed annular shoulder surface. A filter insert of filter material in the can has an annular outwardly directed flange sitting on the shoulder surface and an upper end wall. A cover fittable over the ring has a lower surface engageable with the seal surface of the ring and with the end wall of the filter insert. Fasteners press the cover down on the ring and filter insert and retaining the cover in place on the ring.

9 Claims, 3 Drawing Sheets

OIL-FILTER ASSEMBLY

FIELD OF THE INVENTION

The present invention relates to an oil-filter assembly. More particularly this invention concerns such a device used to purify the oil circulated through a tap selector.

BACKGROUND OF THE INVENTION

A standard Type 51 oil-filter assembly sold by Maschinenfabrik Reinhausen as BA 18/03de-1196/1000 has a normally stationary base unit formed as an upwardly open cylindrical can on which or in which is mounted a pump-motor unit. A cover closes the top of the can and normally has a fitting connected via a flexible oil line to the piece of equipment whose oil is being filtered. The oil is filtered by being passed through a sleeve-like filter insert held in the can. A simple paper filter is used to eliminate particles from the oil and composite filters are used in high-humidity environments to also strip out any water droplets.

The cover for the assembly has a rod that projects axially through the filter insert which is secured to it by a nut and washer. As a result changing the filter insert is a very messy job. The cover and attached insert must normally be completely disconnected so that a tool can be applied to the nut to loosen it and allow the old insert to be removed. Since the filter insert itself is soaked in oil, such a job is sure to spread oil around the work space. In addition the mass of the cover and filled insert are considerable so that it is not easily lifted out of the base unit. At the very least the area around the filter assembly can be counted on to be well sprinkled with dirty oil during such a filter change.

OBJECTS OF THE INVENTION

It is therefore an object of the present invention to provide an improved oil-filter assembly.

Another object is the provision of such an improved oil-filter assembly which overcomes the above-given disadvantages, that is which is easy to service, in particular whose insert can easily be removed and replaced with minimal difficulty or mess.

A further object is to provide an improved filter insert.

SUMMARY OF THE INVENTION

An oil-filter assembly has according to the invention an upwardly open can generally centered on an upright axis and having at an upper rim a mounting ring having in turn an axially upwardly directed annular seal surface and, offset axially downward therefrom, an annular upwardly directed annular shoulder surface. A filter insert of filter material in the can has an annular outwardly directed flange sitting on the shoulder surface and an upper end wall. A cover fittable over the ring has a lower surface engageable with the seal surface of the ring and with the end wall of the filter insert. Fasteners press the cover down on the ring and filter insert and retaining the cover in place on the ring.

Thus with this system the filter insert is not fixed to the cover. The cover can be unfastened, typically by undoing a few peripheral bolts, and set aside, then the filter insert lifted out of the can separately. The procedure can be done quite neatly and, since the two parts are separate, neither is so unwieldy to make handling a problem.

The seal surface of the mounting ring lies radially outside the shoulder surface. In addition the lower surface of the cover is stepped and has an outer portion engaging the seal surface and an inner portion offset axially downward from the outer portion and engaging the filter-insert end wall.

The mounting ring in accordance with the invention is formed with a throughgoing passage. The assembly further has a pressure gauge mounted on the ring and connected to the passage, and a pressure switch mounted on the ring and connected to the passage. The cover is provided with a central port and the insert is annular and sleeve-shaped. The port opening into the insert.

An oil-filter insert has according to the invention a cylindrical and metallic outer wall centered on an axis, a substantially closed bottom end wall downwardly closing the outer side wall, an annular top wall projecting radially inward from the side wall, a filling of filter material carried on the side wall between the top and bottom walls, and a radially outwardly flange projecting radially from the side wall axially spaced from the top end wall.

The flange projects perpendicularly from the side wall and is elastically deformable.

The oil-filter insert according to the invention further has at least one bale wire secured to insert adjacent the end wall and movable elastically between a compressed position lying wholly below the end wall and an uncompressed position projecting upward past the end wall. The top end wall can be formed with an annular groove in which the bale wire is mounted.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
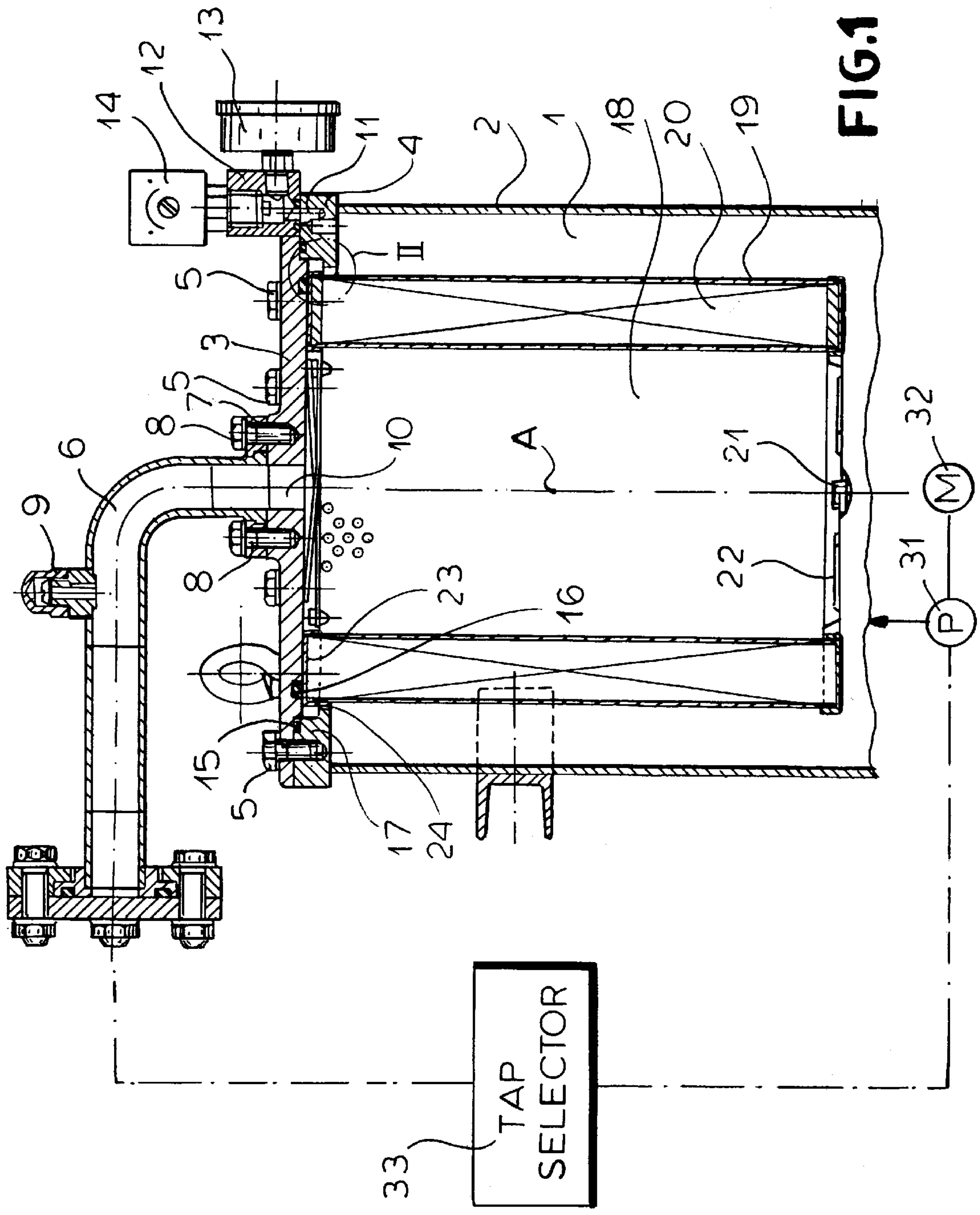
FIG. 1 is a partly diagrammatic through the oil-filter assembly according to the invention.

As seen in FIG. 1 an oil-filter assembly has a filter 1 formed as a cylindrical can 2 centered on an upright axis A and normally holding or attached to a pump 31 and motor 32 that draws oil from a tap selector 33 or the like. The can 2 has a mounting ring 4 at its upper rim to which is secured a metallic cover 3. Angularly spaced bolts 5 are threaded through the cover 3 into the mounting ring 4 to lock it in place, compressing an O-ring or other seal 15 set in a downwardly open annular groove of the mounting ring 4. An intake or return pipe 6 coming from the tap selector 33 has an end flange 7 secured via bolts 8 to the center of the cover 3 and is provided with an openable vent 9. It is aligned with a central port 10 in the cover 3. The cover 3 has a circular central downwardly extended portion 34 (FIG. 2) that fits within the inner periphery of the mounting ring 4 to ensure easy centering of the cover 3 on the can 2. The mounting flange 4 is formed with a passage 11 connected to a pressure gauge 13 and a start-stop pressure switch 14 both carried on the cover 3.

Figure 2:
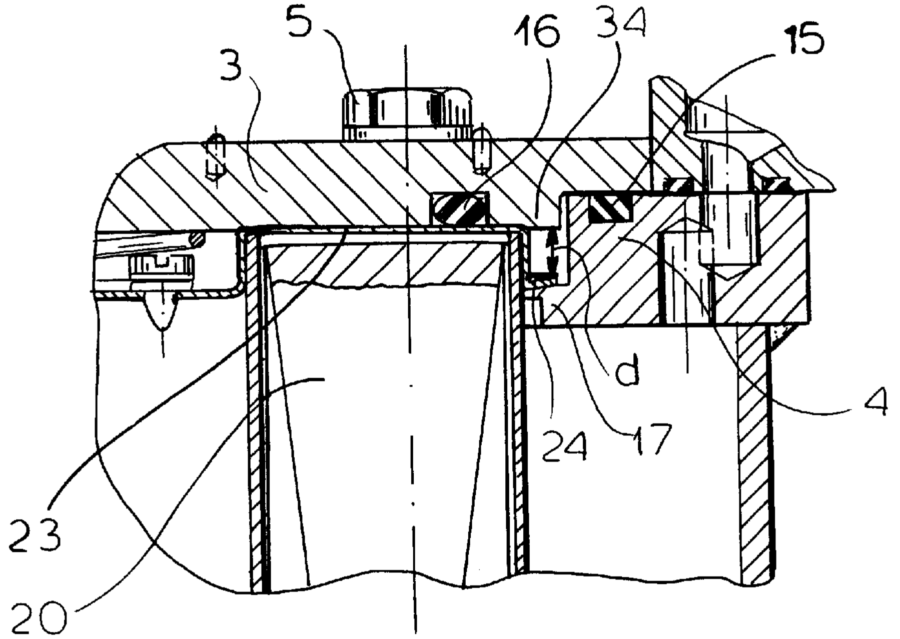
FIG. 2 is a large-scale view of the detail indicated at II in FIG. 1.
Figure 3:
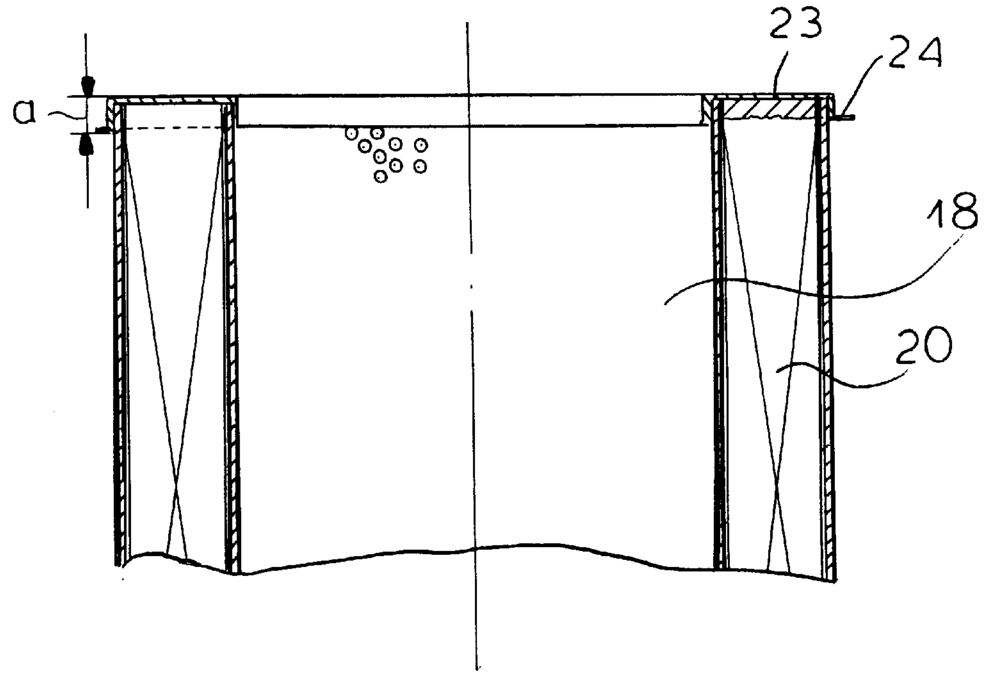
FIG. 3 is a vertical section through an upper portion of the filter in accordance with the invention.

A filter insert 18 is formed as a sleeve with a cylindrical and perforated metallic outer side wall 19 and a filling 20 of filter material such as paper or zeolite. It has a closed bottom wall 22 provided with a removable central knockout plug 21 that can be removed for use of the insert 18 in older models of filter assemblies. In addition as better shown in FIG. 2 it has a planar and annular upper end wall 23 and is formed with an elastically deformable and radially outwardly projecting flange 24 that sits on a shoulder 17 of the mounting ring 4. An O-ring 16 is set in another downwardly open groove of the cover 3 and is compressed by the cover 3 against the top wall 23 when the cover 3 pushes the insert 18 down in the can 2, elastically deforming the flange 24 as illustrated in FIG. 2. The distance between the bottom surface of the flange 24 and the top surface of the wall 23 is slightly more than the distance d between the top surface of the shoulder 17 and the bottom face of the cover 3 to ensure this elastic deformation of the flange 24. According to the invention the flange is of St 1203 steel some 0.8 mm thick so that it can be bent some 2 mm without deforming plastically, allowing the filter to be cleaned and reused if desired. When not installed, the flange 24 projects radially, lying in a plane, but when installed it assumes a slightly frustoconical shape.

Figure 4:
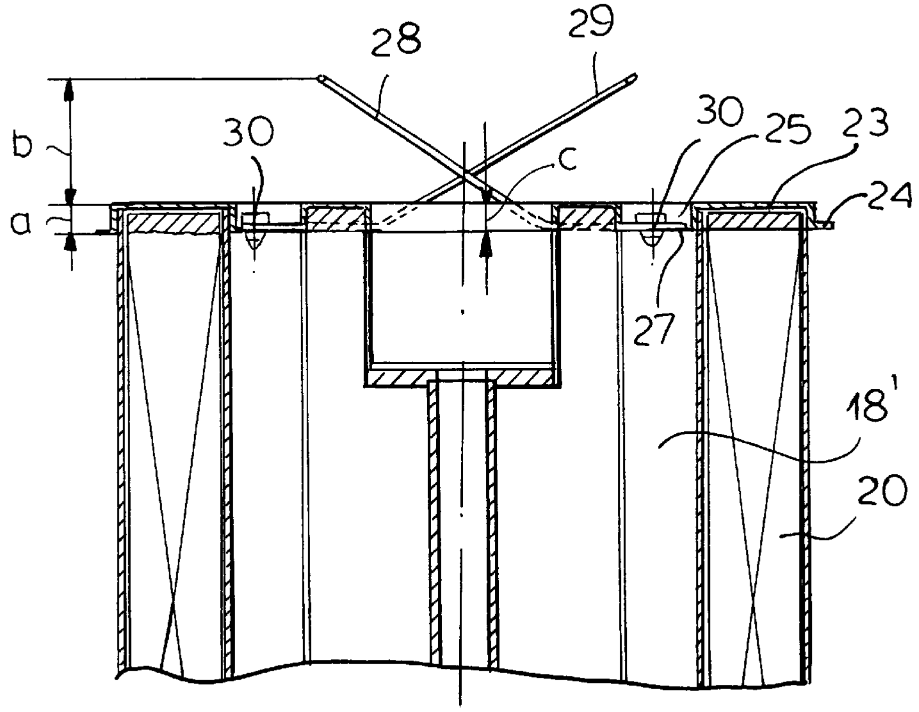
FIG. 4 is a view like FIG. 3 of another filter according to the invention.
Figure 5:
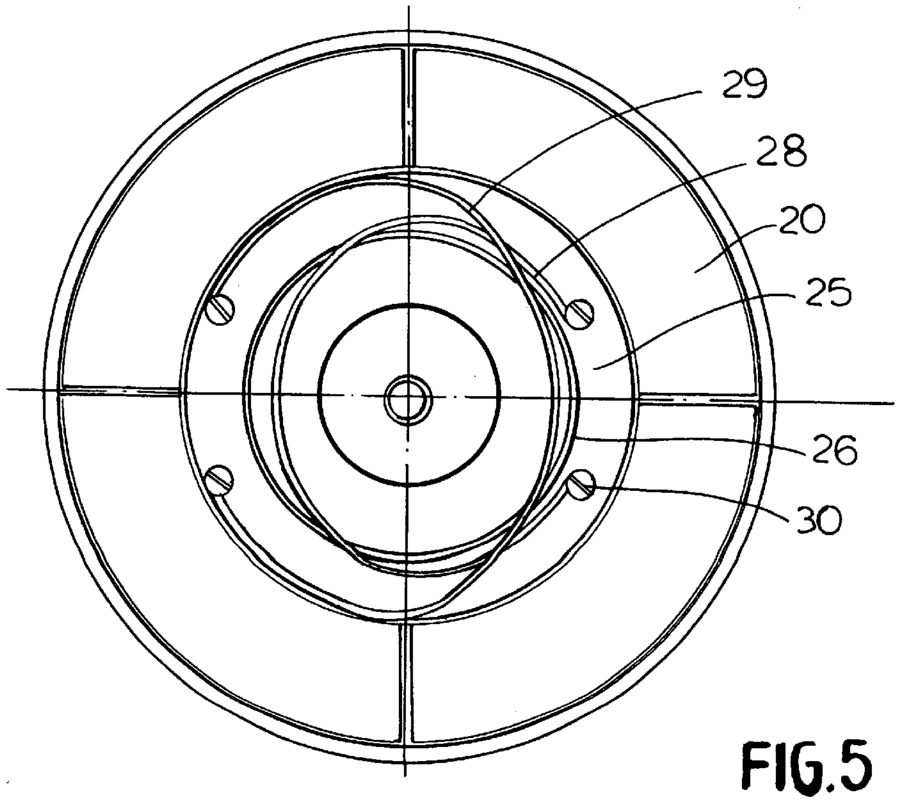
FIG. 5 is a top view of the filter of FIG. 4.

FIGS. 4 and 5 show an alternative insert 18' whose top wall 23 is formed with an upwardly open annular groove or recess 25 having an inner periphery 26. A pair of C-shaped bale wires 28 and 29 are fixed by screw 30 to a floor of this groove 25 and are shaped such that they can be compressed elastically to lie wholly below the surface of the end wall 23, but otherwise project a distance b well above this surface. The loop of the wire 29 is larger than that of the wire 28 so the latter lies within the former in the compressed position. The groove 26 has a depth c which is more than the diameters of the wires 29 so they are wholly contained in it when the system is assembled. These bale wires 28 and 29 make it easy to pick up the filter, even when it is soaked with oil.

Thus to change the insert 18 the screws 5 are withdrawn and the cover 3 is lifted. This can be done very neatly as it leaves the insert 18 in place. The offset of the shoulder 17 is sufficient that the small amount of oil that runs out of the pipe 6 during such opening will be contained in the system and not overflow it.

The insert 18 can then be lifted out by means of the bales 28 and 29. It can be cleaned or discarded. Then the cleaned inert or a new insert are set back into place and the cover 3 is reinstalled and screwed back down. The entire operation can be done in the field relatively easily yet in service will function as well as a prior-art system requiring substantially more work to change its filter insert.

We claim:

1. An oil-filter assembly comprising an upwardly open can generally centered on an upright axis and having at an upper rim a mounting ring formed with a throughgoing passage and having an axially upwardly directed annular seal surface and an annular upwardly directed annular shoulder surface offset axially downward from the upwardly directed annular seal surface;

a filter insert of filter material in the can and having an annular outwardly directed flange sitting on the shoulder surface and an upper end wall;

a cover fittable over the ring and having a lower surface engageable with the seal surface of the ring and with the upper end wall of the filter insert;

means including fasteners for pressing the cover down on the ring and filter insert and retaining the cover in place on the ring;

a pressure gauge mounted on the ring and connected to the passage; and a pressure switch mounted on the ring and connected to the passage.

2. An oil-filter assembly comprising an upwardly open can generally centered on an upright axis and having at an upper rim a mounting ring having an axially upwardly directed annular seal surface and, offset axially downward therefrom, an annular upwardly directed annular shoulder surface;

a filter insert of filter material in the can and having an annular outwardly directed flange sitting on the shoulder surface and an upper end wall, a cylindrical and metallic outer side wall centered on the axis, a substantially closed bottom wall downwardly closing the outer side wall, the upper end wall projecting radially inward from the side wall, and a filling of filter material carried on the side wall between the upper end wall and bottom wall, the flange projecting radially from the side wall and axially spaced from the upper end wall;

a cover fittable over the ring and having a lower surface engageable with the seal surface of the ring and with the upper end wall of the filter insert;

means including fasteners for pressing the cover down on the ring and filter insert and retaining the cover in place on the ring; and at least one bale wire secured to the insert adjacent the upper end wall and movable elastically between a compressed position lying wholly below the upper end wall and an uncompressed position projecting upward past the upper end wall.

3. The oil-filter assembly defined in claim 2 wherein the upper end wall is formed with an annular groove in which the bale wire is mounted.

4. An oil-filter assembly comprising an upwardly open can generally centered on an upright axis and having at an upper rim a mounting ring having an axially upwardly directed annular seal surface and, offset axially downward therefrom and radially offset inward therefrom, an annular upwardly directed annular shoulder surface, the can being laterally closed and fluid tight below the seal surface;

a filter insert of filter material in the can having a generally planar and annular upper end wall and an annular flange extending radially outward immediately below the upper end wall and sitting on the shoulder surface;

a cover fittable over the ring and having a lower surface engageable with the seal surface of the ring and with the upper end wall of the filter insert; and means including fasteners for pressing the cover down on the ring and filter insert, for pressing the flange down on the shoulder surface, and for retaining the cover in place on the ring.

5. The oil-filter assembly defined in claim 4 wherein the lower surface of the cover is stepped and has an outer portion engaging the seal surface and an inner portion offset axially downward from the outer portion and engaging the upper wall.

6. The oil-filter assembly defined in claim 4 wherein the cover is provided with a central port and the insert is annular and sleeve-shaped, the port opening into the insert.

7. The oil-filter assembly defined in claim 4 wherein the insert includes:

a cylindrical and metallic outer wall centered on the axis;

a substantially closed bottom wall downwardly closing the outer side wall, the upper end wall projecting radially inward from the side wall; and a filling of filter material carried on the side wall between the upper end wall and bottom wall, the flange projecting radially from the side wall and axially spaced from the upper end wall.

8. The oil-filter assembly defined in claim 7 wherein the flange projects perpendicularly from the side wall when the cover is not fully pressed down on the ring and filter insert.

9. The oil-filter assembly defined in claim 7 wherein the flange is elastically deformed when the cover is fully pressed down on the ring and filter insert.

* * * * *